Figure 1:
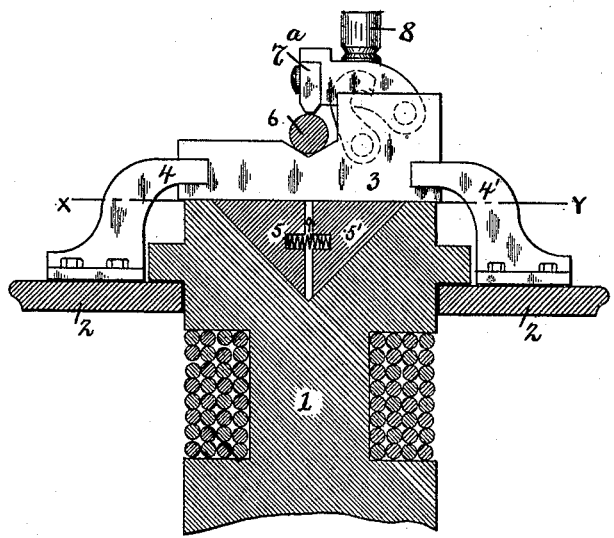

(No Model.) 3 Sheets—Sheet 1.

H. LEMP.
SLIDING CLAMP FOR ELECTRIC WELDING APPARATUS.

No. 465,866. Patented Dec. 29, 1891.

WITNESSES
Thos. F. Courcey
Wm H. Capel

INVENTOR
Hermann Lemp
By H. L. Townsend
Atty.

(No Model.)  H. LEMP.  3 Sheets—Sheet 2.
SLIDING CLAMP FOR ELECTRIC WELDING APPARATUS.
No. 465,866.  Patented Dec. 29, 1891.
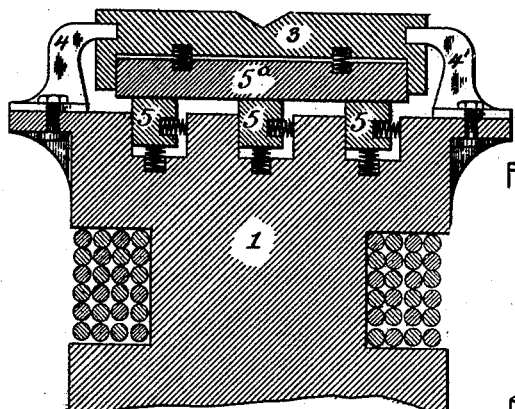
Fig. 5.
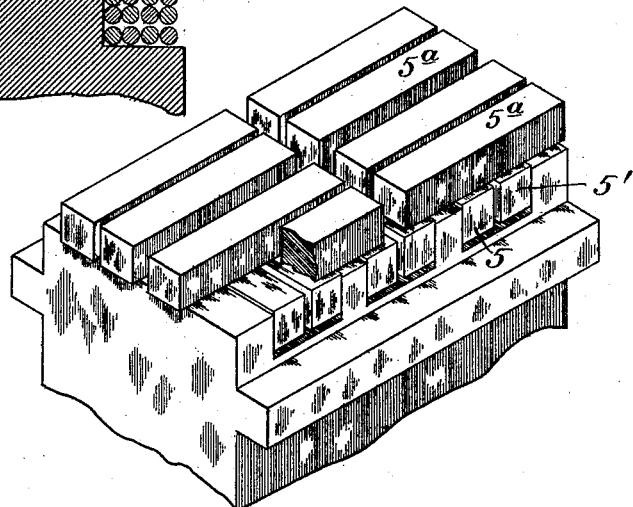
Fig. 6.
Fig. 7.  Fig. 8.
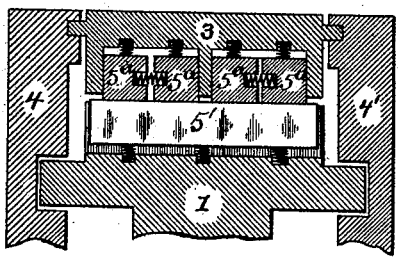 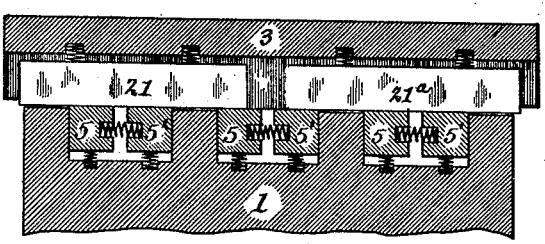
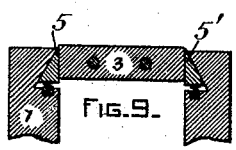 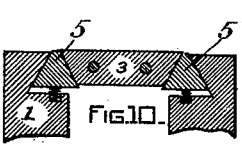 
Fig. 9.  Fig. 10.  Fig. 11.
WITNESSES  
Thos. F. Courey.  
Wm. H. Capel.
INVENTOR  
Hermann Lemp  
By H. C. Townsend  
Atty (No Model.) 3 Sheets—Sheet 3.
H. LEMP.
SLIDING CLAMP FOR ELECTRIC WELDING APPARATUS.
No. 465,866. Patented Dec. 29, 1891.
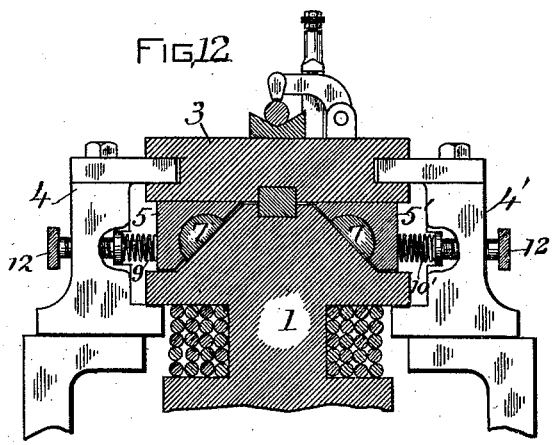
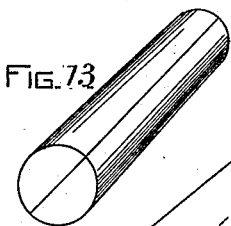
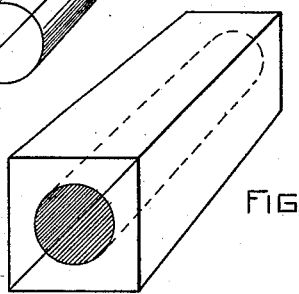
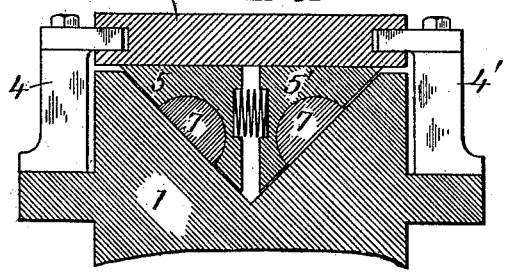
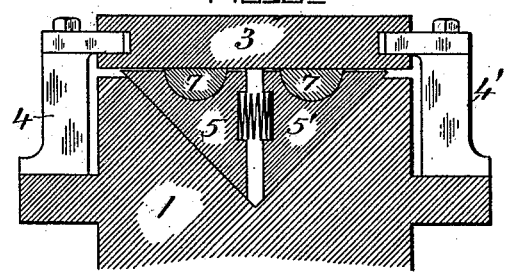
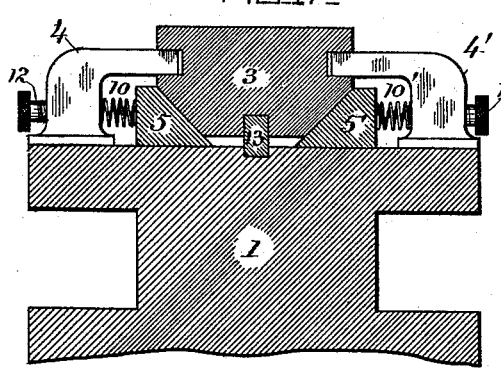
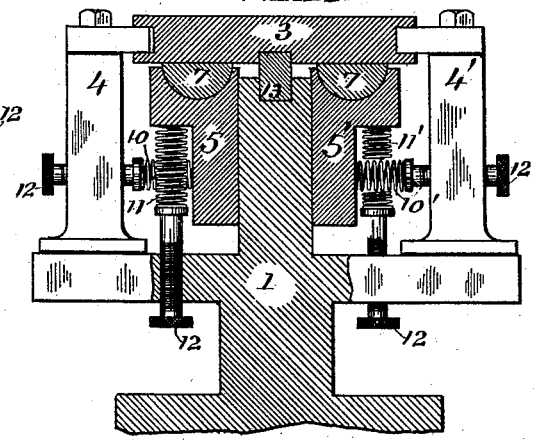
WITNESSES
T. F. Courey
Wm. I. Capel
INVENTOR
Hermann Lemp
By H. C. Townsend
Atty

UNITED STATES PATENT OFFICE.

HERMANN LEMP, OF LYNN, MASSACHUSETTS, ASSIGNOR TO THE THOMSON ELECTRIC WELDING COMPANY, OF MAINE.

SLIDING CLAMP FOR ELECTRIC WELDING APPARATUS.

SPECIFICATION forming part of Letters Patent No. 465,866, dated December 29, 1891.

Application filed January 19, 1891. Serial No. 378,223. (No model.)

*To all whom it may concern:*

Be it known that I, HERMANN LEMP, a citizen of the United States, and a resident of Lynn, in the county of Essex and State of Massachusetts, have invented a certain new and useful Sliding Clamp for Electric Welding Apparatus, of which the following is a specification.

My invention relates to the construction of electric apparatus wherein one part of conducting material slides in or upon another part; also, of conducting material fixed with relation to the first and connected with a source of electric energy which supplies electric current to the sliding or moving part through the said relatively-fixed part.

The invention is designed especially to improve the construction of electric metal working apparatus wherein, for various reasons, the movable or sliding part which carries or operates on the work in a welding or upsetting operation has to be very carefully constructed. As such sliding parts make electrical connection between the metal to be operated upon and the stationary parts of the apparatus, and as currents of large volume are used, the resistance of the sliding surfaces must be as small as possible. The friction of the slide should also be a minimum in order to consume little power and secure ease and quickness of movement. These qualities have been secured, but only by the most careful and particular attention to the construction of flat surfaces, which are likely to become worn and are costly to renew. A common form of sliding contact has been two V's, one sliding within the other. In this form as long as the movable V is forced in a perfectly-straight line the contact is good; but a slight tilting forward or sidewise results in sparking and burning, that ruins the smooth motion it possessed at first.

The object of the present invention is to provide a simple and efficient means whereby the sliding or moving part of the apparatus may receive electric current from a fixed part connected with a source of energy, to which end the invention consists in the combination, with said parts, of one or more adjustable or yielding conducting blocks or pieces having double contact-faces, one serving as that through which connection may be made as the one part slides upon the other and the other serving as the contact which preserves connection with the stationary part as the block follows the slide to accommodate itself to any movement of the slide to or from said fixed part.

My invention consists, further, in certain details of construction and combinations of parts hereinafter described, and more specifically stated in the claims.

Figure 2:
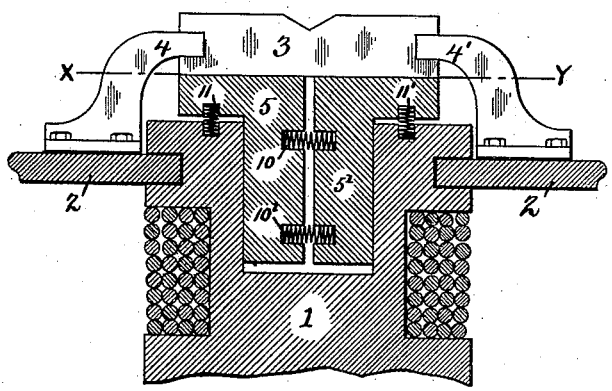
Figure 3:
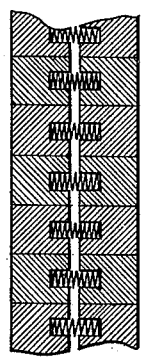
Figure 4:
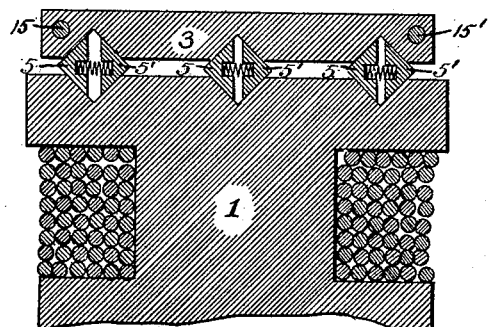

In the accompanying drawings, Figure 1 is a cross-section through the parts of an electric welding or metal-working apparatus to which my invention is applied. The fixed or stationary part is shown as forming the terminal of the secondary of a transformer. Fig. 2 illustrates a modification in the form of the interposed contact-blocks. Fig. 3 shows a detail modification. Fig. 4 shows a further modification in the disposition and form of the contact-blocks. Figs. 5, 6, 7, and 8 illustrate modifications wherein the contact-blocks are seated in or upon both the moving and the stationary parts. Figs. 9, 10, and 11 show further modifications in the shape and disposition of the contact-blocks. Fig. 12 is a cross-section of an apparatus, showing the application of the self-adjusting contact-shoes. Figs. 13 and 14 illustrate details of the manufacture of the same and of the contact-block to which it is applied. Figs. 15, 16, 17, and 18 show further modifications in the form and disposition of the parts.

In Fig. 1 the stationary part or block of metal which forms a terminal of or is connected to the secondary of a transformer a dynamo of large capacity, a storage-battery, or any other suitable source of electric energy is indicated at 1. It is here shown as the secondary bar of a transformer.

In the top of 1 is a V groove or depression, in which lie conducting blocks or pieces 5 5', of copper or other suitable material, which have inclined flat sides fitting against the sides of the V-groove in 1 and at their top are in contact by another contact-face at an angle to the side with a sliding support, which carries or is connected with the work—such, for instance, as a bar or piece of metal to be welded or upset. A spring 9 between the blocks or otherwise applied tends to move them toward the inclined contact-faces formed by the sides of the V-groove in which they lie. On top is the slide 3, which is guided mechanically by the guide-pieces 4 4', secured to the table 2, which may form a part of the welding apparatus.

The bar to be welded or otherwise worked is shown in section at 6, and is held in contact with 3 by means of a dog 7ª, operated by screw 8. The wearing-surface is on the line x y, and the spring 9 always keeps the pieces 5 5' in contact with 3, as well as with 1. Even if the guides were not perfectly true throughout their length, the contact would be sure.

In Fig. 2 a modification is shown. The parts 1, 2, 3, 4, and 5 5' are the same as in Fig. 1, with the exception that the blocks 5 5' are of different form and the angle of the contact-faces on the interposed block or blocks, through which faces connection is made, respectively, with the part 1, and the slide 3 is a right angle, and the groove in 1 has parallel faces opposite one another and vertical to the plane in which the slide moves. In this case it becomes expedient to use independent pressure-springs pressing in directions at right angles to one another. Hence the pieces 5 and 5' are held in contact with 1 by side pressure-springs 10 and 10', and in contact with 3 by vertical pressure-springs 11 and 11', whereas in Fig. 1, where the two contact-faces of the block or blocks make an acute angle, a single-acting pressure-spring may be used, its pressure being applied at an acute angle to one of the contact-faces, so that it will cause the block to tend to ride or slide on said face in a direction to preserve contact also by the other face. It is not necessary that the parts 5 5' should be of one continuous piece the whole length of the terminal; but they may be made of several pieces placed side by side, each held by a spring, as shown in Fig. 3. This would make the slide still more sure of even contact in case of irregularities in the guides.

Fig. 4 shows a further modification, wherein several sets of interposed contact-blocks are employed, each block having its two contact-faces at a right angle; but the contact-faces on the slide are made by cutting into the bottom of the same at an angle so that the plane of the contact-face forms an angle with the plane of sliding instead of being parallel thereto. It is convenient to form V-grooves in the slide, as shown, each of which receives two blocks 5 5'. In this figure holes adapted to receive guide-rods for the slide are indicated at 15 15'.

In the several forms of the invention so far described the shape of the interposed blocks 5 5' necessitates a certain amount of fine work in constructing them that may be largely avoided by modifications to be now described.

In the construction shown in Fig. 5 part 1 has square grooves formed in its top parallel with the line of movement of the slide, in which grooves are placed rods 5 of good conducting material, such as copper, forming the interposed blocks between the slides and 1. The rods may have a square section and are acted upon by the springs, as before. The sliding contact wear-surface of 3 may consist of bars or rods 5ª let into transverse grooves in the bottom of the same and seated upon suitable springs tending to hold them against the surfaces of the parts carried by 1, as also against the sides of the grooves in which they are seated. The wear-surfaces are thus all replaceable or removable for truing or renewal. In this construction, as well as that shown in Figs. 6, 7, and 8, the contact-blocks of my invention are practically duplicated, two sets being provided, one supported or carried by the slide, the other by part 1. Each set, however, acts in the manner required to preserve the connection by two contact-faces, which allow, respectively, for the movement of the slide in a plane parallel to the part 1, and for the movement of the one part away from or toward the other. The contact blocks or pieces may, as indicated, be applied to one or both of the parts. The rods may be ordinary square stock and need not be finished to any extent, the contact-faces needing a slight preparation only to smooth them. The wear is entirely between these rods, and the more they are used the better the contact-surface. The contact is found to be good, even if the guides are not perfectly true. This is a very valuable and desirable condition, as great care and skill are not necessary in the construction of the guides. The amount of friction is reduced to a minimum and ease of working is easily secured.

Figs. 6, 7, and 8 illustrate modifications of this construction. Fig. 6 illustrates the relative position of the bars, rods, or blocks 5, 5', and 5ª, and in Figs. 7 and 8 the blocks which are shown in side view in one figure are shown in cross-section in the other. In this construction the grooves run opposite to those in Fig. 5. Those in the slide are parallel to the direction of movement, and those in the stationary part transverse to the same. The four rods 5ª are arranged in pairs, two in one groove, with a spring between them to make contact. The same arrangement is used with the rods 5 5' in the stationary part, as shown in Fig. 8. Instead of using one long piece in the slide, two short pieces 21 21ª may be used, as indicated, so that all of these may be of the same length and not complicate the construction of the apparatus.

Figs. 9, 10, and 11 show three simple forms of interposed blocks between the stationary and movable parts, and will explain themselves.

In any form employed the object of the invention is to provide a means of compensating for wear of sliding surfaces and to produce a flexibility that will allow for rough usage and any irregularities in the mechanical operation.

In some of the forms of the invention hereinbefore described there is difficulty in planing the two or more surfaces so that they will be at the exact angle to each other required. One surface is easily made; but two, if required at any exact relation to each other, are very difficult, unless much trouble is taken to grind them or scrape them or subject them to some similar operation. For instance, in Fig. 1 the interposed pieces 5 and 5', if single blocks, are required to have surfaces at exactly forty-five degrees in order to make good connections between movable slide 3 and secondary 1. This is true, also, where the piece 1 has inclined contact-surfaces formed at opposite sides of a projection, as in Fig. 12, instead of in a V-groove, as in Fig. 1. In order to avoid this difficulty I provide at one of the contact-faces of the interposed block and either upon the block itself or upon the opposite part to be engaged by it, or even upon both, one or more self-adjusting shoes or supplemental blocks, which have the proper flat contact-surfaces, but are seated in semicircular or curved recesses, in which they may turn to accommodate themselves to the plane of the opposite contact-face. These shoes or blocks may be like bars seated in long grooves, or may be short sections of such a bar, or might even be sections of a sphere, seated in hemispherical cavities. While the utility of these self-adjusting contact-shoes is evident in the case of the contact-blocks, the two contact-surfaces of which make an acute angle, it will be obvious that they would be also useful with blocks in which the two surfaces are at a right angle. I have shown them, however, as applied in combination with the first-named form. It is convenient to make these self-adjusting shoes or blocks as half-cylinders 7, Fig. 12, fitting in a longitudinal groove. In this case the grooves are shown as made on the blocks 5 5'. By this construction the surface of 5 5', making contact with 3, is alone necessarily exact, while the precise angle necessary will be attained by the piece 7 shifting in its groove slightly.

The block and its shoe may be made in the following manner, (indicated in Figs. 13 and 14:) A square block of copper is split diagonally, the two pieces placed together again, and a hole bored and reamed carefully, Fig. 14. Another block is split, Fig. 13, surfaces planed and smoothed, halves placed together and turned down in the lathe to a diameter the same as that of hole in other block, and is polished and made to fit the hole nicely. The two pieces are separated and used as in Fig. 12. One flat surface only of each of the triangular pieces—to wit, that making contact with 3—is necessarily carefully smoothed and polished. Outside pressure-springs 10 10' are applied as shown. Each may be provided with means, as indicated at 12, for adjusting its pressure. Similar means may be used with the springs in the modifications, as indicated.

When the guides are attached to the table surrounding the welder, they are insulated from it; but when attached to the secondary itself no insulation is used. Insulation in the first case is necessary to prevent the current from short-circuiting through the table from the guides from each clamp.

Fig. 15 illustrates practically the same arrangement as in Fig. 1; but the fixed part 1, forming the terminal of the secondary, is of different shape. A spring is placed in between the two blocks to hold them in connection with 1. Fig. 16 shows a similar construction, the self-adjusting shoes or blocks 7 7 making contact, however, with 3 instead of with 1.

Fig. 17 shows a modification of the general construction. The springs are made adjustable, and an extra guide 13 is used to secure rigidity.

Fig. 18 illustrates another modification, wherein the pieces 5 and 5' are similar to the form shown in Fig. 2 and are provided with the self-adjusting pieces or shoes 7. Besides the spring 10 and 10' are others 11 and 11', both sets adjustable to hold 5 and 5' in contact with both 3 and 1. The spring 11' is broken away to show spring 10'.

What I claim as my invention is—

1. The combination, substantially as described, of an electric conducting-slide, a stationary conducting part connected to a source of electric energy, and an interposed yielding or adjustable contact block or blocks having double contact-faces, one making connection with the slide or a part moving therewith and adapted to preserve connection as the slide moves over the stationary conducting part and the other making connection with the fixed part and adapted to preserve connection therewith on movement of the slide in a direction away from such fixed part.

2. The combination, in an electric metal-working apparatus, of a slide, and a yielding or movable contact block or blocks interposed between the same, and a stationary part connected with the source of energy, said blocks having contact-faces at an angle to one another, whereby the block may follow the slide to preserve connection therewith and may at the same time keep contact with the stationary part connected to the source of energy.

3. The combination, in an electric metal-working apparatus, of a work-bearing slide, guides therefor, a stationary block or piece connected with the source of energy, and interposed spring-pressed conducting-blocks having sliding contact with both the movable and the stationary parts.

4. In an electric welding or metal-working apparatus, the combination, with the slide or work-holder and the electrode forming the terminal of the source of electric energy, of an interposed yielding contact block or blocks, as and for the purpose described.

5. The combination, in an electric metal-working apparatus, of a work-bearing slide 3, a stationary part connected with the source of energy, and an interposed yielding block or blocks having double contact-faces, one for making contact with the slide, and the other with the stationary part or part connected therewith.

6. The combination, substantially as described, of a guided slide, a stationary part from which it receives electric energy, and an interposed connecting block or blocks having two rubbing contact-faces, one engaged by the slide or a part connected therewith during movement of the slide over the stationary part and the other making contact with the stationary part or a part connected therewith, and rubbing thereon when the slide and connecting-block move in a direction away from said stationary part.

7. The combination, substantially as described, in an electric metal-working apparatus, of a guided work-holding block or slide, a stationary bed or mass of conducting material connected to a source of electric energy and over which said slide moves, and one or more interposed conducting blocks or pieces having two sliding or rubbing contact-faces at an angle to one another, one contact-face being engaged by the conducting-slide or a part carried thereby and the other by the stationary conducting part or a part connected therewith.

8. The combination, with movable and stationary electric conductors in sliding electric connection, of one or more interposed conducting blocks or pieces of metal, each having two sliding contact faces or surfaces, one allowing for normal sliding movement of the one part with relation to another, and the other preserving connection for movement in a direction at right angles to such normal sliding movement.

9. The combination, substantially as described, in an electric metal-working apparatus, of a work-bearing slide, a fixed conductor or electrode supplying current thereto, and two spring-pressed contact-blocks having an interposed spring tending to separate them and provided with sliding or rubbing contact-faces making an acute angle with one another and engaged, respectively, by the conducting-slide and by the fixed conductor or electrode.

10. The combination, with a conducting-slide and a fixed conducting part in electrical connection therewith, of one or more spring-pressed interposed blocks having double sliding contact-faces, and self-adjusting contact-shoes, as and for the purpose described.

11. In an electric metal-working apparatus, the combination of a slide 3, a terminal 1, connected with the source of energy, one or more interposed blocks, a spring or springs acting thereon to preserve sliding contact on two different surfaces, and self-adjusting contact-shoes at one of said surfaces, as and for the purpose described.

12. The combination, substantially as described, of a conducting-slide 3, a block 1, one or more interposed blocks 5, having contact-surfaces at an angle, and a self-adjusting shoe or shoes 7, resting in semicircular grooves in the said blocks 5.

13. The combination, with two conducting blocks or pieces, one movable over the other, of an intermediate contact-block having two sliding contact-faces, and a semi-cylindrical contact-shoe having its flat side presented for contact with an opposed contact-surface and resting in a semicircular groove in a side of said contact-block, as and for the purpose described.

Signed at Lynn, in the county of Essex and State of Massachusetts, this 13th day of January, A. D. 1891.

HERMANN LEMP.

Witnesses:
 JOHN W. GIBBONEY,
 WARREN B. LEWIS.